United States Patent
Raghunath et al.

(10) Patent No.: US 7,554,909 B2
(45) Date of Patent: Jun. 30, 2009

(54) DYNAMIC SERVICE MANAGEMENT FOR MULTICORE PROCESSORS

(75) Inventors: Arun Raghunath, Beaverton, OR (US); Erik J. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 686 days.

(21) Appl. No.: 11/086,595

(22) Filed: Mar. 21, 2005

(65) Prior Publication Data
US 2006/0227771 A1    Oct. 12, 2006

(51) Int. Cl.
*H04L 12/26* (2006.01)
*H04L 12/56* (2006.01)
*G06F 0/46* (2006.01)

(52) U.S. Cl. .......... 370/230; 370/235; 370/422; 370/464; 709/225; 718/105

(58) Field of Classification Search .......... 718/100, 718/103, 105, 104; 370/389, 912; 709/221, 709/225, 226
See application file for complete search history.

(56) References Cited

U.S. PATENT DOCUMENTS

| | | | | |
|---|---|---|---|---|
| 5,604,905 A | * | 2/1997 | Tevanian et al. | 717/140 |
| 5,930,511 A | * | 7/1999 | Hinsley | 717/164 |
| 5,978,844 A | * | 11/1999 | Tsuchiya et al. | 709/221 |
| 6,223,205 B1 | * | 4/2001 | Harchol-Balter et al. | 718/105 |
| 7,171,654 B2 | * | 1/2007 | Werme et al. | 717/130 |
| 7,216,348 B1 | * | 5/2007 | deCarmo | 718/105 |
| 2002/0194251 A1 | * | 12/2002 | Richter et al. | 709/105 |

* cited by examiner

*Primary Examiner*—Chi H. Pham
*Assistant Examiner*—Soon D. Hyun
(74) *Attorney, Agent, or Firm*—Kacvinsky LLC (57) ABSTRACT

A system, apparatus, method and article to perform dynamic service management for multicore processors are described. The apparatus may include, for example, a processing device having multiple types of processors to process packets. A service manager may dynamically assign executable files for multiple services to the multiple types of processors during execution of the executable files based on packets processed for each service. Other embodiments are described and claimed.

18 Claims, 7 Drawing Sheets

DYNAMIC SERVICE MANAGEMENT FOR MULTICORE PROCESSORS

BACKGROUND

Multicore processors such as network processors may process network information in the form of packets. Processing packets may comprise, for example, sending and receiving packets across a network. The flow of network traffic may be dynamic, and the ability of a network processor to perform packet processing may be affected by the current state of the network. A need exists for a multicore processor that is capable of adapting to network variations without unduly burdening the performance of packet processing by the multicore processor

DETAILED DESCRIPTION

Some embodiments may be directed to dynamic service management techniques for asymmetric multicore processing architectures, such as a network processor, for example. In one embodiment, for example, a service manager may be arranged to perform service based adaptation to assign certain services to certain processors. Services may be reassigned to other processors based on a real time monitoring system that monitors data flow through a system to measure usage of a particular service. For example, a service with an increasing load may be reassigned from a slower processor to a faster processor to compensate for the increase in demand. In another example, a service with a decreasing load may be reassigned from a faster processor to a slower processor to compensate for the decrease in demand. The embodiments are not limited in this context.

Figure 1:
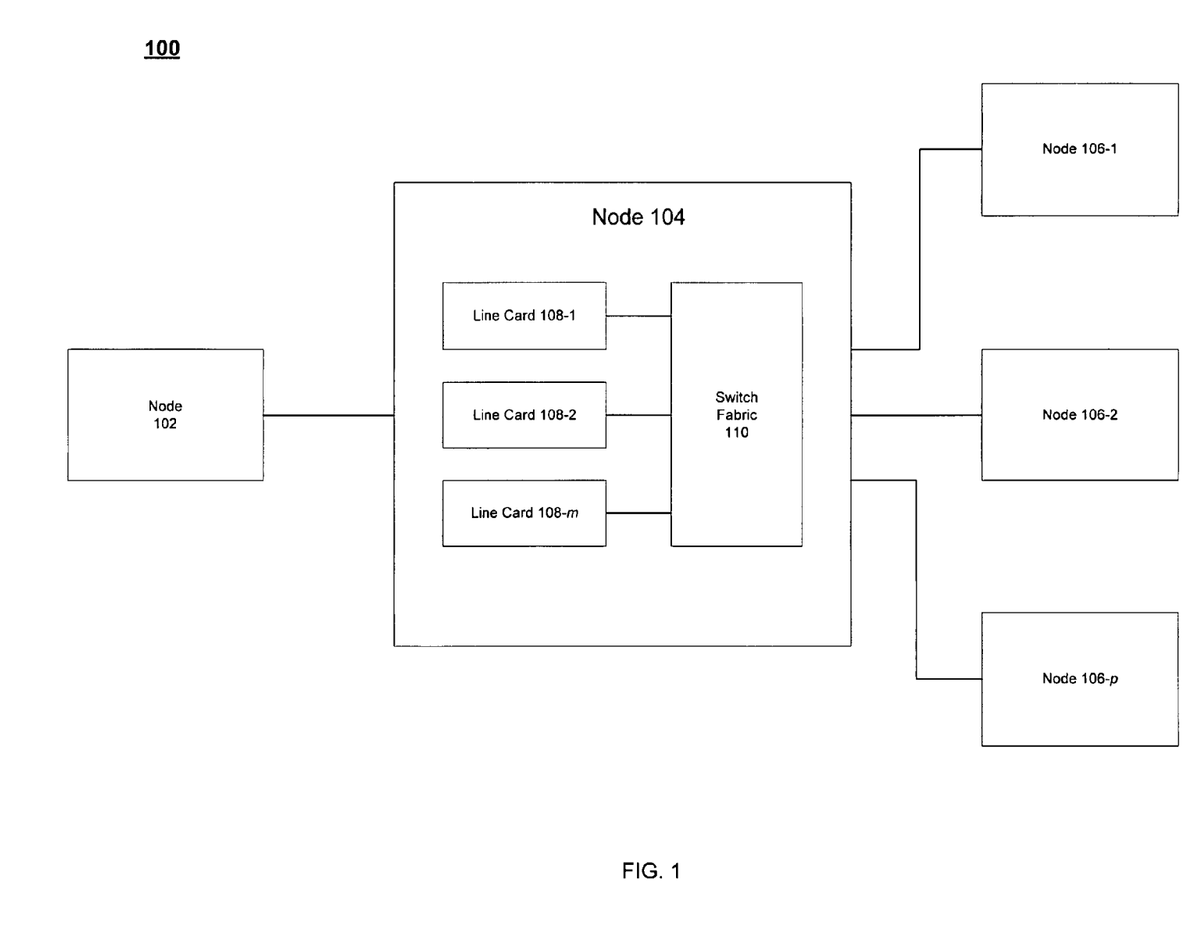
FIG. 1 illustrates one embodiment of a system.

FIG. 1 illustrates one embodiment of a system. FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant, router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information is used herein in a very general sense and may refer to any data representing content meant for a user, such as voice information, video information, audio information, text information, numerical information, alphanumeric symbols, graphics, images, symbols, and so forth. Control information is also used herein in a very general sense and may refer to any data representing commands, instructions or control words meant for an automated system. For example, control information may be used to route media information through a system, or instruct a node to process the media information in a certain manner. The embodiments are not limited in this context.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may comprise a packet network communicating information in accordance with one or more packet protocols, such as one or more Internet protocols, such as the Transport Control Protocol (TCP) and Internet Protocol (IP). In another example, system 100 may communicate packets using a medium access control protocol such as Carrier-Sense Multiple Access with Collision Detection (CSMA/CD), as defined by one or more IEEE 802 Ethernet standards. In yet another example, system 100 may communicate packets in accordance with one or more Asynchronous Transfer Mode (ATM) protocols, Frame Relay, Systems Network Architecture (SNA), and so forth. The embodiments are not limited in this context.

System 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth. The embodiments are not limited in this context.

When implemented as a wireless system, system 100 may include one or more wireless nodes arranged to communicate information over one or more types of wireless communication media. An example of a wireless communication media may include portions of a wireless spectrum, such as the radio-frequency (RF) spectrum. The wireless nodes may include components and interfaces suitable for communicating information signals over the designated wireless spectrum, such as one or more antennas, wireless transmitters/ receivers ("transceivers"), amplifiers, filters, control logic, and so forth. Examples for the antenna may include an internal antenna, an omni-directional antenna, a monopole antenna, a dipole antenna, an end fed antenna, a circularly polarized antenna, a micro-strip antenna, a diversity antenna, a dual antenna, an antenna array, and so forth. The embodiments are not limited in this context.

Referring again to FIG. 1, system 100 may comprise multiple types of nodes, such as node 102, node 104, and nodes 106-1-$p$. Although FIG. 1 is shown with a limited number of nodes in a certain topology, it may be appreciated that system 100 may include more or less nodes in any type of topology as desired for a given implementation. The embodiments are not limited in this context.

In one embodiment, nodes 102 and 106-1-$p$ may each comprise a network device arranged to communicate media and control information. In one embodiment, for example, nodes 102 and 106-1-$p$ may each be implemented as a computer. The nodes can communicate information to each other in the form of discrete data sets. The data sets may sometimes be referred to as a packet, cell, frame, fragment, unit, and so forth (collectively referred to herein as a "packet"). A packet may have a fixed or varying length, and is typically represented in terms of bits or bytes. A typical packet length, for example, might comprise 64 bytes. The embodiments are not limited in this context.

In general operation, node 102 may comprise a source node arranged to communicate information to one or more nodes 106-1-$p$ by segmenting a set of media information and control information into a series of packets. Each packet may contain a portion of the media information plus some control information, with each packet having a sequence number. The control information may assist various intermediate nodes to route each packet from node 102 to its intended destination, such as one or more of destination nodes 106-1-$p$. The destination node may receive the entire set of packets, place them in the correct order using the sequence numbers, and use them to reproduce the media information from node 102.

In one embodiment, node 104 may comprise an example of an intermediate node. Node 104 may be implemented as, for example, a network forwarding device. Network forwarding device 104 may comprise any network device arranged to send and receive packets in a network. Examples for network forwarding device 104 may include a computer, server, switch, a switch blade, router, bridge, gateway, hub, wireless access point, base station, radio network controller (RNC), mobile subscriber center (MSC), and so forth. In one embodiment, for example, network forwarding device 104 may be implemented as a switch. Although some embodiments are described in the context of a switch solely by way of example, it may be appreciated that the embodiments may be implemented using other network forwarding devices as previously described. The embodiments are not limited in this context.

In one embodiment, switch 104 may be arranged to operate in accordance with one or more MAC protocols, such as from the IEEE 802.3 series of Ethernet protocols, for example. Switch 104 may be implemented as a high bandwidth switch, such as a Fast Ethernet switch operating at 100 megabits per second (Mbps), a Gigabit Ethernet switch operating at 1000 Mbps or 10 Gigabits per second (Gbps), and so forth. The embodiments are not limited in this context.

In one embodiment, switch 104 may comprise one of the intermediate nodes used to transport the packets through system 100. Switch 104 may switch packets between the various nodes of system 100. For example, switch 104 may switch packets from source node 102 to a destination node 106-1-$p$. Each packet may include a source address and destination address. Switch 104 may receive the packet, retrieve the destination address, and send the packet to another intermediate node or destination node based on the destination address.

In one embodiment, switch 104 may include one or more line cards 108-1-$m$ coupled to a switch fabric 110. Line cards 108-1-$m$ may be used to process data on a network line. Each line card acts as an interface between a network and switch fabric 110. Line cards 108-1-$m$ may convert the data set from the format used by the network to a format for processing. Line cards 108-1-$m$ also may perform various processing on the data set as described in more detail with reference to FIG. 2. After processing, the line card converts the data set into a transmission format for transmission across switch fabric 110. The line card also allows a data set to be transmitted from switch fabric 110 to the network. The line card receives a data set from switch fabric 110, processes the data set, and then converts the data set into the network format. The network format can be, for example, ATM or a different format.

In one embodiment, line cards 108-1-$m$ may comprise half-duplex processor based line cards. A half-duplex processor based line card may use multicore processors to achieve full duplex network communications. For example, the half-duplex processor based line card may use a first multicore processor for inbound traffic and a second multicore processor for outbound traffic. Inbound data traffic is typically traffic from the media to the switch fabric 110, while outbound traffic is typically data traffic from the switch fabric 110 to the media. Each multicore processor typically communicates with the switch fabric 110 in only one direction. Alternatively, line cards 108-1-$m$ may be implemented using a single multicore processor for both inbound and outbound traffic, although this may reduce throughput relative to an arrangement using multiple multicore processors. The embodiments are not limited in this context.

In one embodiment, for example, the multicore processor may be implemented as a network processor. A network processor may comprise a processor designed specifically for packet processing, a core element in high-speed communications routers and switches. Similar in some ways to a general purpose processor, a network processor is a programmable chip. The instruction set for the network processor, however, has been optimized to support the operations needed in networking, particularly for packet processing. Network processors therefore provide the programmability of a general purpose processor, with the speed of a dedicated custom hardware, such as an Application Specific Integrated Circuit (ASIC). A network processor suitable for some embodiments may be described in more detail with reference to FIGS. 2 and 3.

Switch 104 may be arranged to support a large number of services. Although switch 104 may support a large number of services, only a subset of these services may be simultaneously active (e.g., experiencing heavy demand) at a given point in time. Further, the subset of active services may vary in response to variations in workload conditions. Consequently, switch 104 may adapt the allocation of processing cores from the multicore processor to certain services on a dynamic basis, sometimes referred to herein as "service based adaptation." Service based adaptation may be particularly useful for packet processing applications for a high-speed communication device, such as switch 104, given the variations in demand for such applications when processing a relatively large number of packets at a relatively high rate of speed.

Some embodiments may use service based adaptation techniques to improve packet processing throughput for switch 104. In one embodiment, for example, switch 104 may comprise a processing device having multiple types of processors to process packets. Switch 104 may also include a service manager to dynamically assign executable files for multiple services to the multiple types of processors during execution of the executable files based on packets processed for each service. Consequently, the service manager may potentially improve performance of switch 104 in particular, and the overall performance of system 100 in general. Accordingly, a user may realize enhanced products and services.

Figure 2:
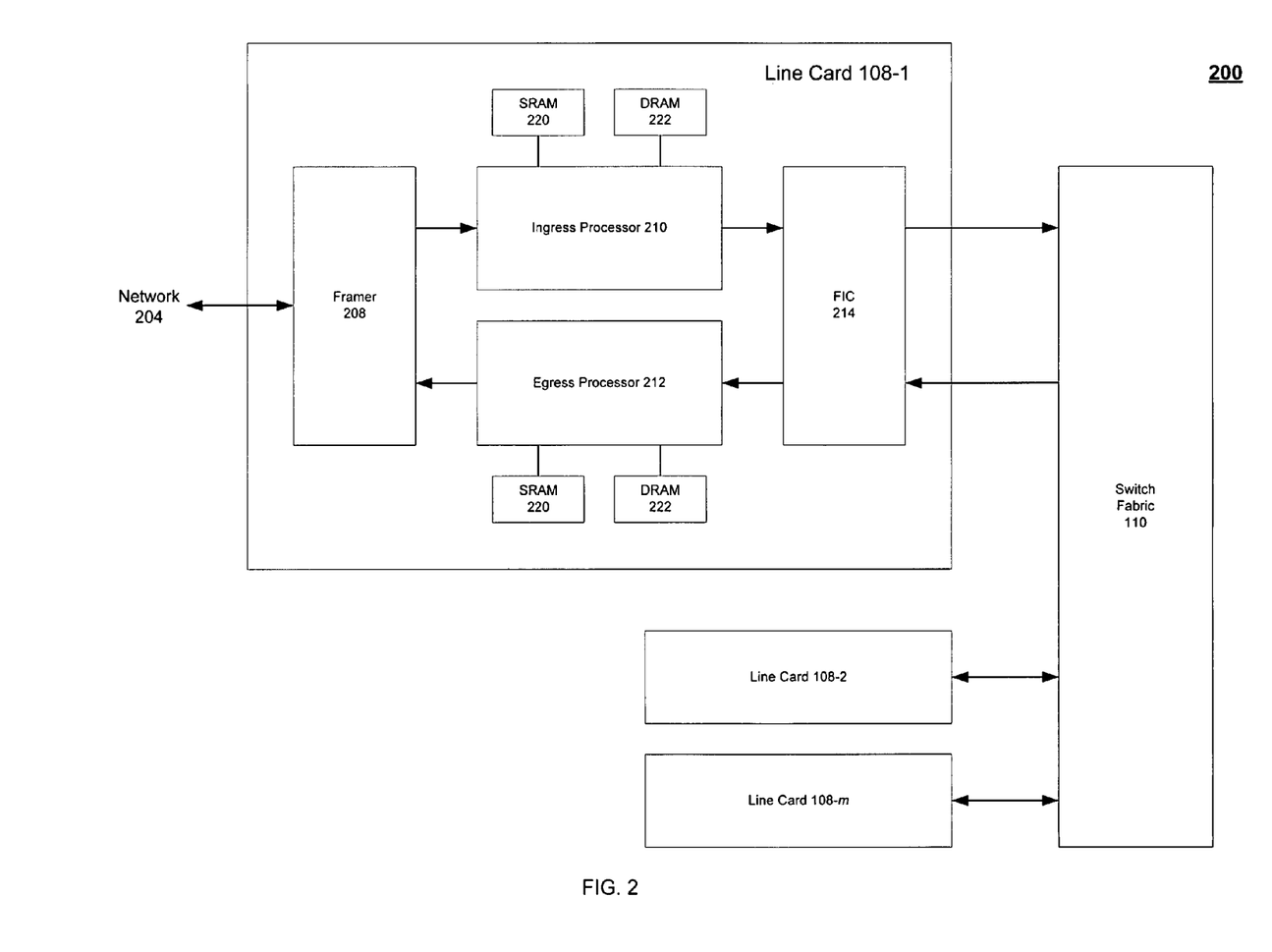
FIG. 2 illustrates one embodiment of a node.

FIG. 2 illustrates one embodiment of a switch. FIG. 2 illustrates a partial block diagram of switch 104. As shown in FIG. 2, switch 104 may comprise multiple elements, such as line cards 108-1-$m$ and switch fabric 110. Some elements may be implemented using, for example, one or more circuits, components, registers, processors, software subroutines, or any combination thereof. Although FIG. 2 shows a limited number of elements, it can be appreciated that more or less elements may be used in switch 104 as desired for a given implementation. The embodiments are not limited in this context.

As shown in FIG. 2, switch 104 may include line cards 108-1-$m$. Line card 108-1 illustrates a partial block diagram of a line card, which may be representative of an implementation for line cards 108-2-$m$ as well. Line card 108-1 may use two half-duplex network processors 210, 212 to provide full-duplex communications. An ingress processor 210 may be used for inbound traffic from network 204 to switch 104, while an egress processor 212 may be used for outbound traffic from switch 104 to network 204. The network 204 may include, for example, all the elements of system 100 to include nodes 102 and 106-1-$p$, and additional nodes as well. The embodiments are not limited in this context.

Each line card may operate as an interface between a network 204 and the switch fabric 110. The line card 108-1 may receive a data set from the network 204 via a framer 208. The framer 208 converts the data set from the format used by the network 204, which may include segmenting the data set to a format for processing. The converted data set is then transmitted to the ingress processor 210. The framer 208 may interface to network processors 210, 212 using a number of different interfaces, such as the interface defined by the Optical Internetworking Forum SPI-4.2 Implementation Agreement or a different interface. The line card 108-1 may also receive a data set from switch fabric 110 via a fabric interface chip (FIC) 214. The FIC 214 converts the data set from the format used by switch fabric 110, and the converted data set is then transmitted to the egress processor 212. The FIC 214 may interface to network processors 210, 212 using a number of different interfaces, such as an interface defined by the Common Switch Interface Specification-L1 (CSIX-L1) or a different interface. The CSIX-L1 protocol allows data to be transmitted from the source to the destination in variable sized units called C-Frames. The embodiments are not limited in this context.

The ingress processor 210 performs various processing operations on the data set before forwarding it to the switch fabric 110. Examples of ingress processing operations may include classification, metering, policing, congestion avoidance, statistics, segmentation, translation, encryption, error checking, traffic scheduling into switching fabric 110, and so forth. After processing, the ingress processor 210 converts the data set into a transmission format for transmission across the switch fabric 110 (e.g., C-Frames), then transmits the data set to the switch fabric 110 via FIC 214.

The line card 202 may also allow a data set to be transmitted from the switch fabric 110 to the network 204. The egress processor 212 receives a data set from the switch fabric 110, and performs various processing operations on the data set before forwarding it to framer 208. Examples of egress processing operations may include reassembly, congestion avoidance, statistics, traffic shaping, and so forth. The egress processor 212 then transmits the data set to the framer 208. The framer 208 converts the data set into the network format. The network format can be, for example, an ATM format or a different format.

Input and output buffering for the ingress processor 210 and egress processor 212 may be accomplished using various memory units 220, 222. For example, input and output buffering may be accomplished using dynamic random access memory (DRAM) buffers 222 linked together by linked list maintained in static random access memory (SRAM) 220, as described further with reference to FIG. 3.

In general operation, packets may be streamed from network 204 into the ingress processor 210 at or above line rate via the framer 208. The processing of the packets begins upon receipt of the initial part of the packet. The parts of the packet are received, reassembled, processed, buffered into DRAM 222, and enqueued for transmission into the switch fabric 110. Subsequently, the packet is scheduled and transmitted into the switch fabric 110 via the FIC 214. The packet may be received by the egress processor 212 from the switch fabric 110 via the FIC 214. The egress processor 212 may reassemble the packet in DRAM 222 and queues the packet for outgoing transmission. Subsequently, the packet is transmitted to the network 204 via the framer 208. At both network processors 210, 212, packet data is written to and read from DRAM 222 only a single time in order to reduce potential blocking caused by data copying. The embodiments are not limited in this context.

As previously described, the ingress processor 210 and egress processor 212 may be implemented using any number of different processing systems. In one embodiment, for example, processors 210, 212 may each be implemented using a network processor. An example of a network processor appropriate for use as processors 210, 212 may be described in more detail with reference to FIG. 3.

Figure 3:
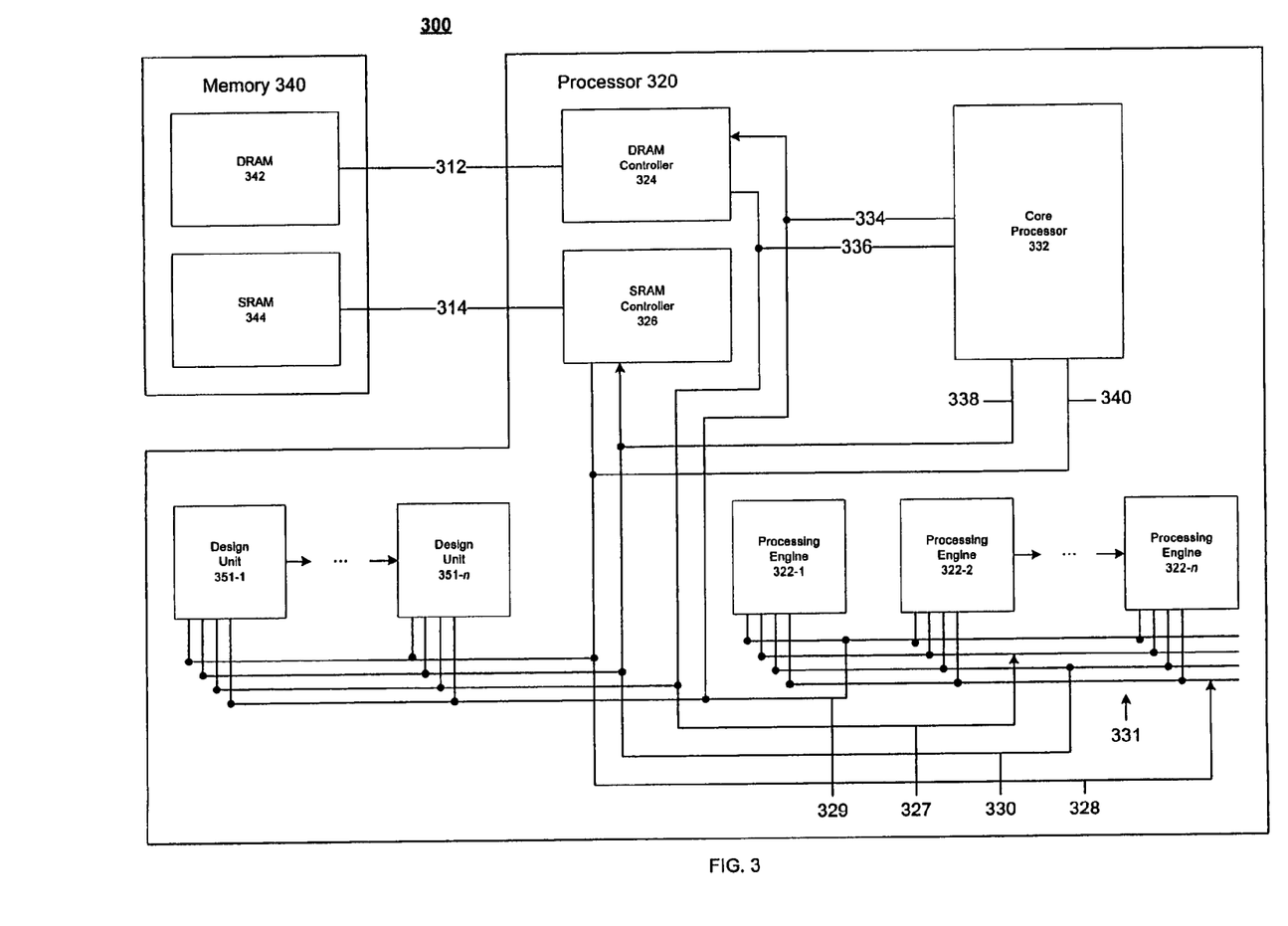
FIG. 3 illustrates one embodiment of a processing system.

FIG. 3 illustrates one embodiment of a processing system. FIG. 3 illustrates a block diagram of a processing system 300. Processing system 300 may be representative of, for example, ingress processor 210 and/or egress processor 212. In one embodiment, processing system 300 may include a memory system 340 and a network processor 320.

In one embodiment, processing system 300 may include the memory system 340. Memory system 340 may include a DRAM unit 342 and a SRAM unit 344. Although some embodiments describe the memory system 340 as including the DRAM 342 and the SRAM 344, it may be appreciated that memory system 340 may be implemented using other memory units as well. In addition, processing system 300 may have access to other memory units other than memory 340. The memory system 340 and other accessible memory units may comprise any machine-readable or computer-readable media capable of storing data, including both volatile and non-volatile memory. For example, the memory units may include read-only memory (ROM), random-access memory (RAM), DRAM, Double-Data-Rate DRAM (DDRAM), synchronous DRAM (SDRAM), SRAM, programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

In one embodiment, processing system 300 may include the network processor 320. The network processor 320 may comprise a parallel, hardware-based multithreaded processor coupled by a pair of memory buses 312, 314 to memory system 340. The processing system 300 may be especially useful for tasks that can be broken into parallel subtasks or functions. Specifically, network processor 320 may be useful for tasks that are bandwidth oriented rather than latency oriented. Network processor 320 may have multiple micro-engines or processing engines 322-1-$n$, each with multiple hardware controlled threads that may be simultaneously active and independently work on a specific task. Examples of network processor 320 may include a network processor based on the Intel® Internet Exchange Architecture (Intel® IXA), such as the IXP2800, IXP2400, and IXP1200 processors, made by Intel(® Corporation, Santa Clara, Calif. The embodiments are not limited in this context.

In one embodiment, network processor 320 may include multiple processing engines 322-1-$n$, where n is equal to 8 or 16, for example. Processing engines 322-1-$n$ may be coupled to each other via next neighbor buses 331. Each processing engine 322-1-$n$ may have capabilities for processing multiple hardware threads or contexts (e.g., 8 threads). Processing engines 322-1-$n$ each may maintain program counters in hardware and states associated with the program counters. Effectively, corresponding sets of context or threads can be simultaneously active on each of processing engines 322-1-$n$ while only one thread per processing engine may be actually operating at any one time.

The processing engines 322-1-$n$ may operate with shared resources including memory system 340 and various bus interfaces. The network processor 320 may include a DRAM controller 324 and a SRAM controller 326. DRAM unit 342 and DRAM controller 324 may be used for processing large volumes of data, for example, processing of network payloads from network packets. SRAM unit 344 and SRAM controller 326 may be used in a networking implementation for low latency, fast access tasks, for example, accessing look-up tables, core processor memory, and so forth.

In one embodiment, push buses 327, 328 and pull buses 329, 330 may be used to transfer data between processing engines 322-1-$n$ and DRAM unit 342 and SRAM unit 344. In particular, push buses 327, 328 may be unidirectional buses that move the data from memory resource 340 to processing engines 322-1-$n$ whereas pull buses 329, 330 may move data from processing engines 322-1-$n$ to their associated DRAM unit 342 and SRAM unit 344 in the memory resource 340.

In one embodiment, processing engines 322-1-$n$ may access either DRAM unit 342 or SRAM unit 344 based on characteristics of the data. Thus, low latency, low bandwidth data may be stored in and fetched from SRAM unit 344, whereas higher bandwidth data for which latency is less important, may be stored in and fetched from DRAM unit 342. Processing engines 322-1-$n$ may execute memory reference instructions to either DRAM controller 324 or SRAM controller 326.

In one embodiment, the network processor 320 may also include a core processor 332 for loading microcode control for other resources of the network processor 320. Core processor 332 may be coupled by a DRAM push and pull bus 334 to DRAM controller 324. Core processor 332 may be coupled by a SRAM push and pull bus 336 to SRAM controller 326.

The core processor 332 may perform general purpose computer type functions such as handling protocols, exceptions, and extra support for packet processing where processing engines 322-1-$n$ may pass the packets off for more detailed processing such as in boundary conditions. Core processor 332 may have an operating system (OS). Through the OS, core processor 332 may call functions to operate on processing engines 322-1-$n$. Core processor 332 may use any supported OS, such as a real time OS. In one embodiment, for example, core processor 332 may be implemented as an XScale® based architecture by Intel Corporation. Core processor 332 may also be implemented using, for example, an OS such as VXWorks from Wind River International of Alameda, Calif., μC/OS from Micrium, Inc. of Weston, Fla., and so forth. The embodiments are not limited in this context.

In one embodiment, the network processor 320 may interface to network devices such as a MAC device, such as a 10/100BaseT Octal MAC or a Gigabit Ethernet device. In general, the network processor 320 may interface to any type of communication device or interface that receives or sends a large amount of data. Similarly, processing system 300 may operate in a networking application to receive network packets and process those packets in a parallel manner.

As previously described, some embodiments may use service based adaptation techniques to improve packet processing throughput for switch 104. In one embodiment, for example, switch 104 may use the network processor 320 to process packets. As previously described, network processor 320 may have multiple types of processors, such as the core processor 332 and the processing engines 322-1-$n$. The core processor 332 and the processing engines 322-1-$n$ may be asymmetrical processors in terms of speed, power, memory resources, and so forth. For example, the core processor 332 may comprise a general purpose processor, and the processing engines 322-1-$n$ may be application specific processors optimized to process packets. Therefore, the performance of each processor type may vary significantly depending on the type of executable code executed by each processor type. The service manager of switch 104 may dynamically assign executable files for certain services to the processor 332 or the processing engines 322-1-$n$.

By using service based adaptation, the service manager may attempt to schedule the services experiencing heavier loads on the processors that are better suited to execute the particular service. Other services may be scheduled onto less efficient processors. This may ensure that the occasional demand for the other services does not disrupt the service having the heavier load. The less efficient processors should be capable of handling the lighter load for the other services. A service manager suitable for use with some embodiments may be described in more detail with reference to FIG. 4.

Figure 4:
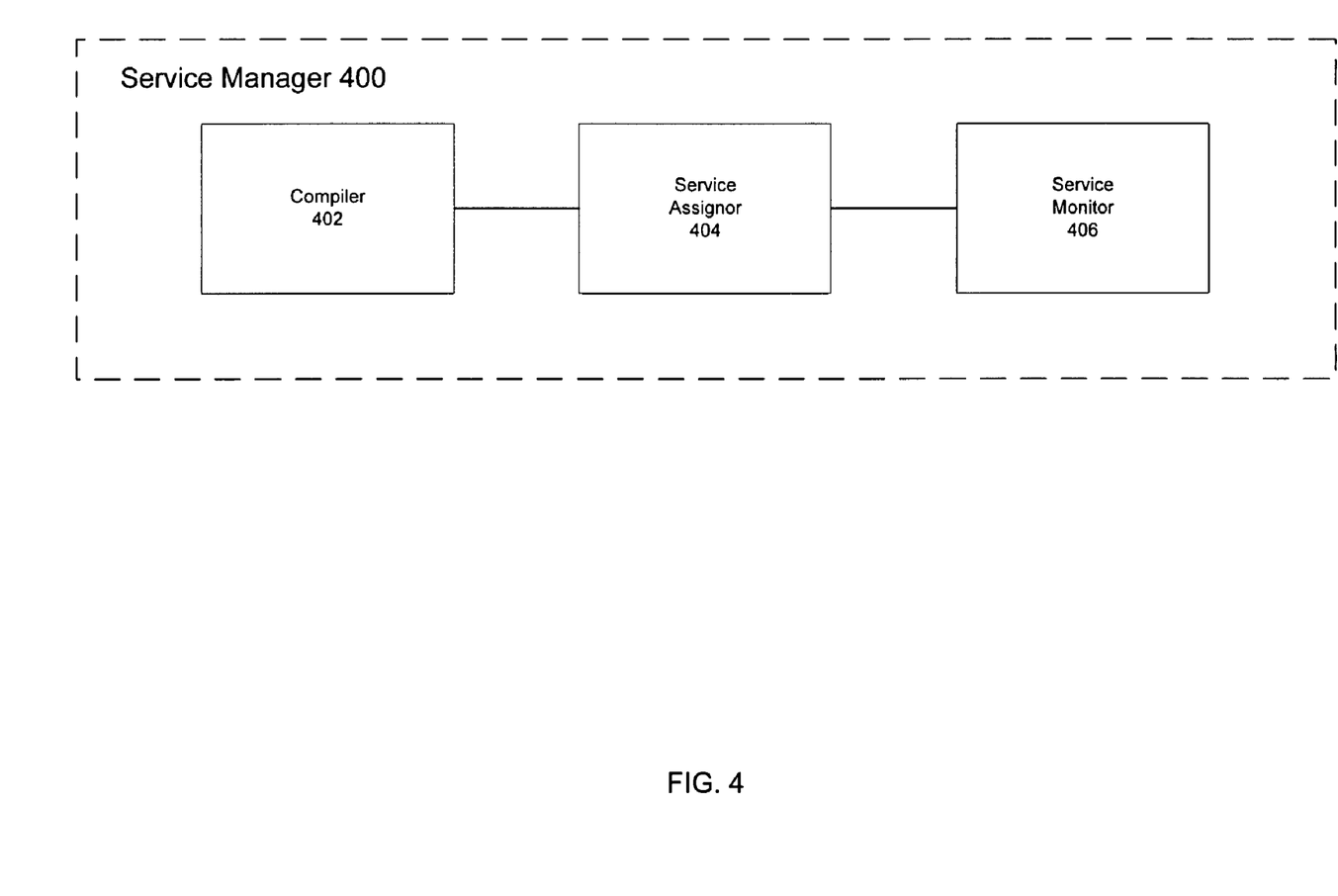
FIG. 4 illustrates one embodiment of a service manager.

FIG. 4 illustrates one embodiment of a service manager. FIG. 4 illustrates a service manager 400. As shown in FIG. 4, service manager 400 may comprise multiple elements, such as compiler 402, a service assignor 404, and a service monitor 406. The elements show in FIG. 4 may be implemented using, for example, one or more circuits, components, registers, processors, software subroutines, or any combination thereof. In one embodiment, for example, service manager 400 may comprise software stored in a memory unit of switch 104. Although FIG. 4 shows a limited number of elements, it can be appreciated that more or less elements may be used in service manager 400 as desired for a given implementation. The embodiments are not limited in this context.

In one embodiment, for example, the service manager 400 may include the compiler 402. The compiler 402 may be arranged to identify multiple service types for an application, and generate executable files for the multiple service types. For example, the compiler 402 may generate a separate set of executable files for each distinct service type. Furthermore, the compiler 402 may generate the set of executable files for a given service type based on the type of processor a service type is expected to be assigned. The compiler 402 may also emit correlation information to correlate the service type and the set of executable files that corresponds to the service type. In addition, the compiler 402 may optimize the executable files.

In one embodiment, an example of an application may include all the software loaded on a network forwarding device (e.g., switch 104) which is responsible for processing data and configuring the state information needed to perform such processing. The application may not necessarily include, however, the run time system responsible for low level resource management. The embodiments are not limited in this context.

In one embodiment, a service type may identify a particular service. A service may refer to a distinct subset of the capabilities offered by an application for a user. Examples of services may include firewall services, classifier services, multi-protocol label switching (MPLS) services, IP version 4 (IPv4) forwarding services, IP version 6 (IPv6) forwarding services, Internet control message protocol (ICMP) services, virtual private networking (VPN) services, natural address translation (NAT) services, dynamic host configuration protocol (DHCP) services, resource reservation setup protocol (RSVP) services, and so forth. The embodiments are not limited in this context.

In one embodiment, the service manager 400 may include the service assignor 404. The service assignor 404 may be arranged to assign the generated executable files to the multiple types of processors (e.g., core processor 332 and processing engines 322-1-n). The service assignor 404 may reassign one or more executable files between heterogeneous processors of network processor 320. Heterogeneous processors may comprise different types of processor. The service assignor 404 may reassign the executable files based on, for example, a service usage parameter for a service type corresponding to the executable file. The service assignor 404 may also reassign one or more executable files between homogenous processors. Homogeneous processors may comprise the same type of processor. The service manager 404 may reassign the executable files between processors of one type based on the service usage parameter for a service type corresponding to the executable file. The embodiments are not limited in this context.

In one embodiment, the service assignor 404 may reassign the executable files in a number of different ways. For example, the service assignor 404 may reassign the executable files on a periodic basis, in accordance with a rule set identifying a certain set of conditions to perform reassignment, in response to an explicit command (e.g., from a user or service administrator), and so forth. Further, the service assingnor 404 may reassign executable files between heterogeneous processors and homogeneous processors using different techniques. For example, the service manager 404 may reassign executable files between heterogeneous processors at a different time interval than homogeneous processors. This may be desirable since homogenous processors may be reassigned on a faster basis relative to heterogeneous processors, for example. The embodiments are not limited in this context.

In one embodiment, the service manager 400 may include the service monitor 406. The service monitor 406 may monitor the data flow through switch 104 to collect statistics for each service. The service monitor 406 may generate one or more statistical parameters based on the monitored data flow. For example, the service monitor 406 may generate a service usage parameter for each service type. The service usage parameter may represent packets processed for a given service type. For example, the service usage parameter may represent a number of packets processed, a rate of packets processed, and so forth. The service usage parameters for the different service types may be sent to service assignor 404 for use in assignment or reassignment operations. The service monitor 406 may also generate other statistical parameters and metrics that may be used by the service assignor 404 for the assignment and reassignment operations as desired for a given implementation. The embodiments are not limited in this context.

In general operation, the service manager 400 may dynamically assign executable files for multiple services to multiple types of processors during execution of the executable files based on the service usage parameter. The compiler 402 may identify multiple service types for an application, and generate executable files for the multiple service types. The complier 402 may also optimize the executable files. The service assignor 404 may assign the executable files to the multiple types of processors, and reassign an executable file to a different type of processor based on a service usage parameter for a service type corresponding to the executable file. The service assignor 404 may also reassign an executable file between processors of one type on a periodic basis based on a service usage parameter for a service type corresponding to the executable file. During execution of the executable files on the processors to process packets, the service monitor 406 may monitor the number of packets processed for each service type, and update the service usage parameter for each service type.

Operations for the above embodiments may be further described with reference to the following figures and accompanying examples. Some of the figures may include logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
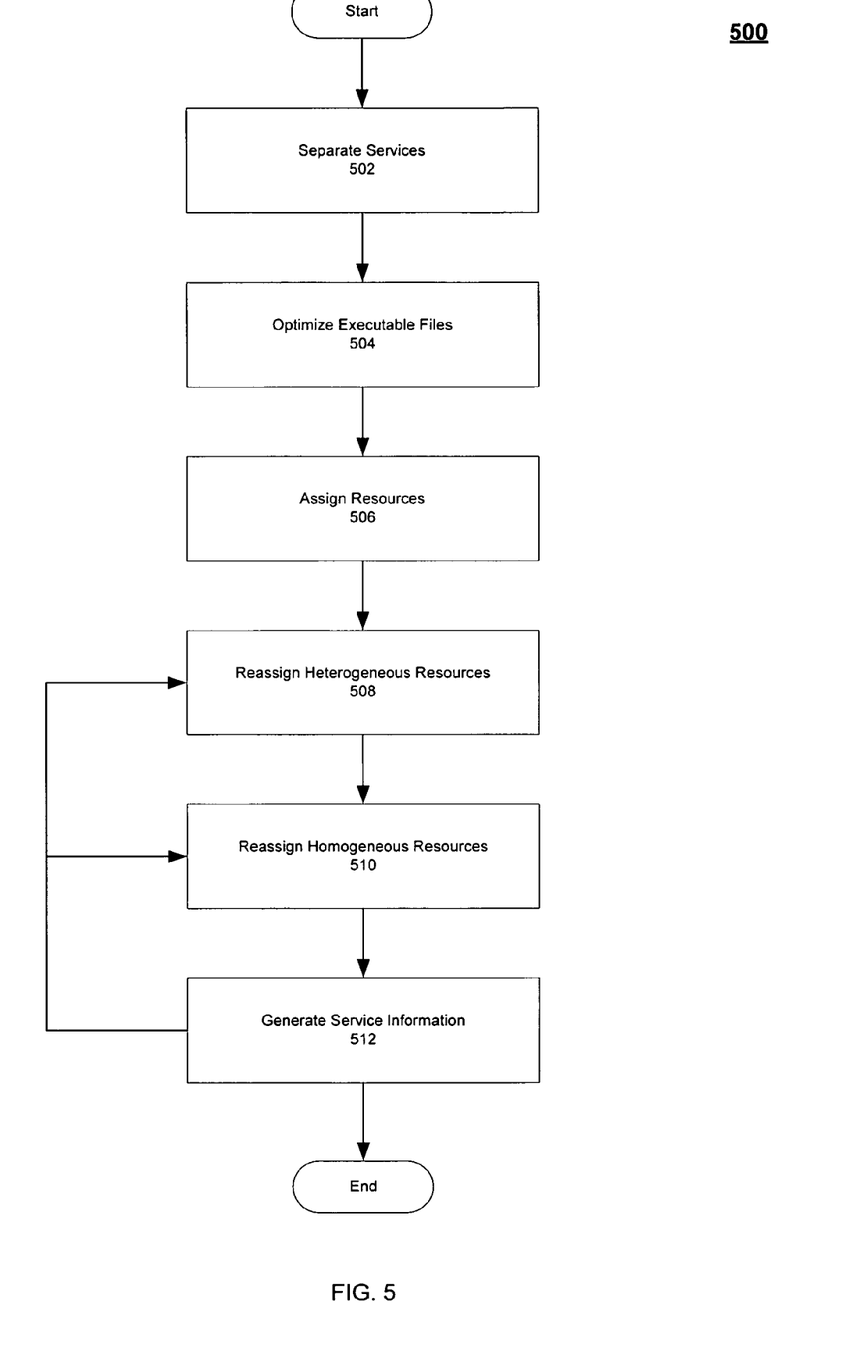
FIG. 5 illustrates one embodiment of a logic diagram.

FIG. 5 illustrates one embodiment of a logic diagram. FIG. 5 illustrates a block flow diagram of a logic flow 500. Logic flow 500 may be representative of the operations executed by one or more structure described herein, such as service manager 400, for example. As shown in logic flow 500, the services may be separated into distinct sets or groups of services at block 502. The executable files may be optimized at block 504. The executable files may be assigned to resources (e.g., processors) at block 506. The executable files may be reassigned to heterogeneous processors at block 508. The executable files may be reassigned to homogeneous processors at block 510. The number of packets executed for a service or by a processor may be monitored, and service information reflecting the monitored resource may be generated at block 512. The operations of blocks 508, 510 may be repeated, at potentially different time intervals, until a terminating condition has been reached. Examples of terminating conditions may include power interruptions, rebooting the network forwarding device, adding services, maintenance, upgrades, and so forth. The embodiments are not limited in this context.

The operation of the above described systems and associated logic flow may be better understood by way of the following examples. FIGS. 6 and 7A-D may be used to illustrate the examples.

Figure 6:
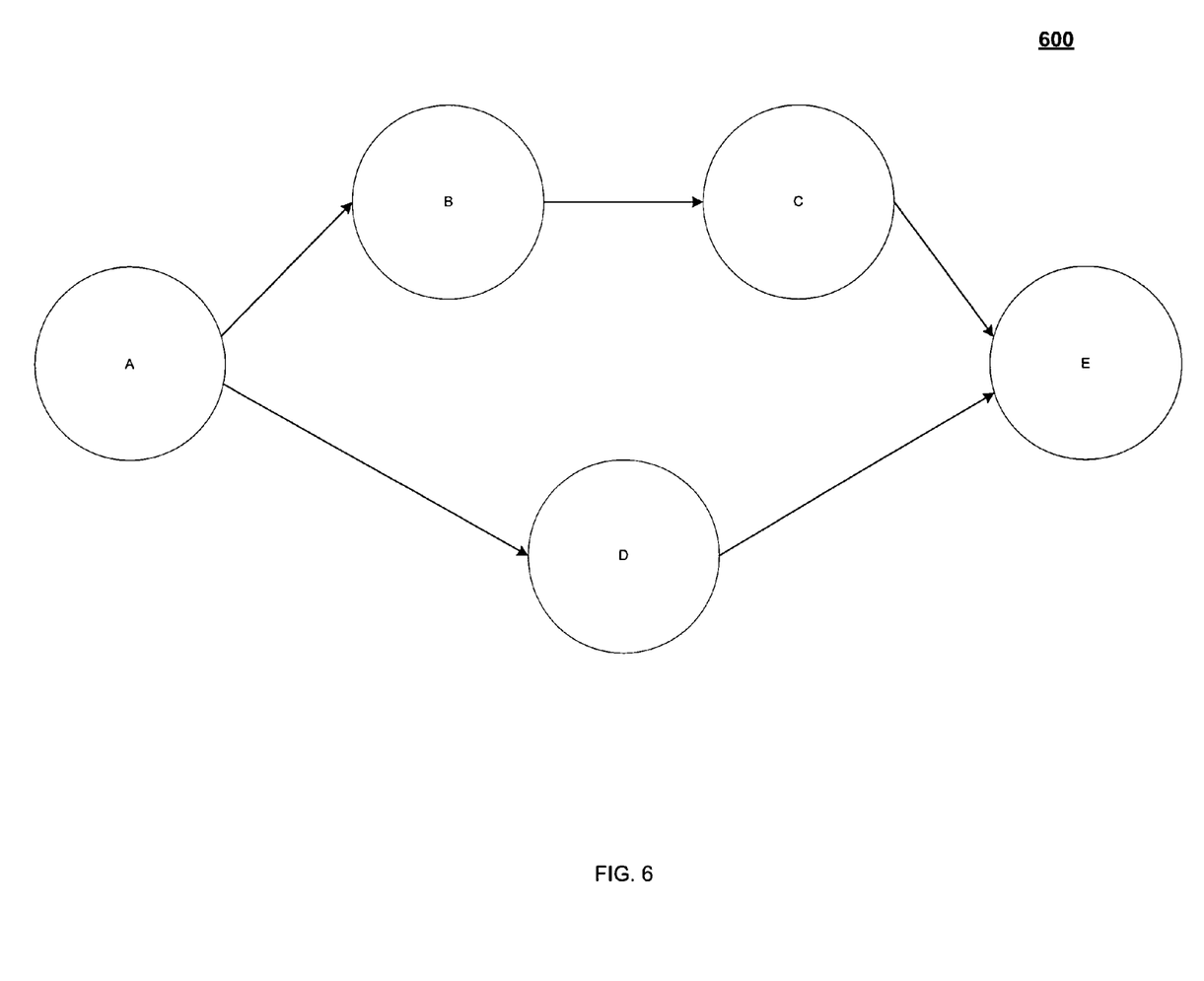
FIG. 6 illustrates one embodiment of a data flow graph.

FIG. 6 illustrates one embodiment of a data flow graph. FIG. 6 illustrates a data flow graph 600. Data flow graph 600 may illustrate different service types for an application. To perform service based adaptation, it may be useful to identify the services for an application. Many common applications, particularly network processing applications which involve protocol layer processing, can be expressed as data flow graphs. The compiler 402 may identify a service as the end-to-end paths in a data flow graph, referred to herein as "service paths." A service may comprise a single service path or multiple service paths. In the latter case, however, improving the performance of a single service path with heavy demand should automatically result in an overall improvement of the service.

Data flow graph 600 is an example of a data flow graph that may be used by the compiler 402. Data flow graph 600 illustrates five data flow actors A-E connected by various data flow channels. Assume the data flow actors A-E each represent a different service. For example, data flow actor A may represent a classifier service, data flow actor B may represent a NAT service, data flow actor C may represent an IPv4 forwarding service, data flow actor D may represent a VPN service, and data flow actor E may represent a transmit service.

Referring again to logic flow 500, the compiler 402 may identify and group the services at block 502. The compiler 402 may logically group services A, B, C, E of data flow graph 600 into one service path, and services A, D, E into another service path. Once the compiler 402 has grouped the services into distinct service paths, the compiler 402 may partition the executable code for the application along the service boundaries, and generate a set of one or more executable files for the service path. The compiler 402 may cluster the executable files within each service path.

In one embodiment, the executable files may be optimized at block 504. The compiler 402 may optimize the executable files using a number of optimizing techniques. For example, the compiler 402 may perform loop unrolling, in-lining certain functions, identify register variables, and so forth. The embodiments are not limited in this context.

Once the compiler 402 generates and optimizes the executable files, a separate set of executable files may exist for each distinct service or set of services. Further, the compiler 402 may generate and optimize the executable files for each distinct service or set of services for each processor type in the system. The compiler 402 may also generate information correlating the service and the set of executable files corresponding to the service. This may be described with reference to FIG. 7A.

Figure 7A:
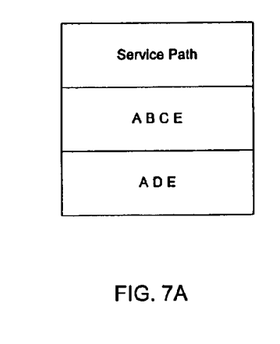
FIG. 7A illustrates one embodiment of service path identification.

FIG. 7A illustrates an example of identifying service paths in accordance with one embodiment. FIG. 7A illustrates an example of service paths (SP) identified using the data flow graph 600. As shown in FIG. 7A, the compiler 402 may identify data flow actors A, B, C, E as comprising part of a first service path (SP1). The compiler 402 may also identify data flow actors A, D, E as comprising part of a second service path (SP2). The compiler 402 may store this information in memory as part of a service path table. The compiler 402 may use the service path table to generate the appropriate executable files.

Figure 7B:
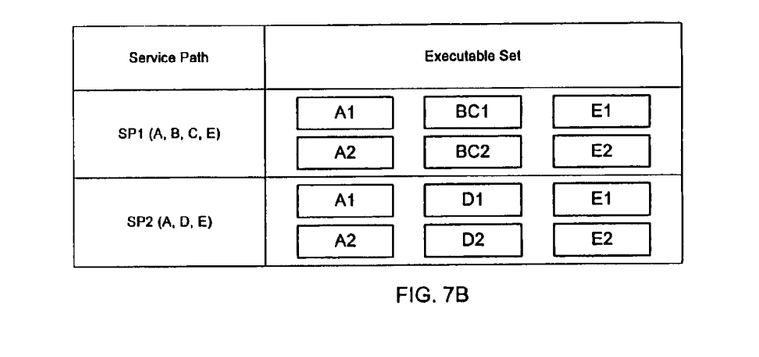
FIG. 7B illustrates one embodiment of executable file generation.

FIG. 7B illustrates an example of generating sets of executable files for services paths in accordance with one embodiment. As shown in FIG. 7A, SP1 may identify a service path comprising data flow actors A, B, C, E, and SP2 may identify another service path comprising data flow actors A, D, E. The compiler 402 may generate a first set of executable files A1, BC1, E1 to support the services SP1 (A, B, C, E) for a first processor type, and a second set of executable files A1, D1, E1 to support the services SP2 (A, D, E) for the first processor type. The compiler 402 may also generate a second set of executable files A2, BC2, E2 to support the services SP1 (A, B, C, E) for a second processor type, and a second set of executable files A2, D2, E2 to support the services SP2 (A, D, E) for the second processor type. The compiler 402 may update the correlation information in the service path table. The compiler 402 may also optimize all or portions of the various sets of executable files to improve performance.

Once the compiler 402 has identified services and produced a set of optimized executable files for each service path, the service assignor 404 may assign the executable files for a service path to one or more processors of network processor 320. The service assignor 404 may perform the initial assignment in accordance with profiled data. Examples of profiled data may include statistical parameters indicating a level of traffic typically found for each service type on a historical basis. The embodiments are not limited in this context.

Figure 7C:
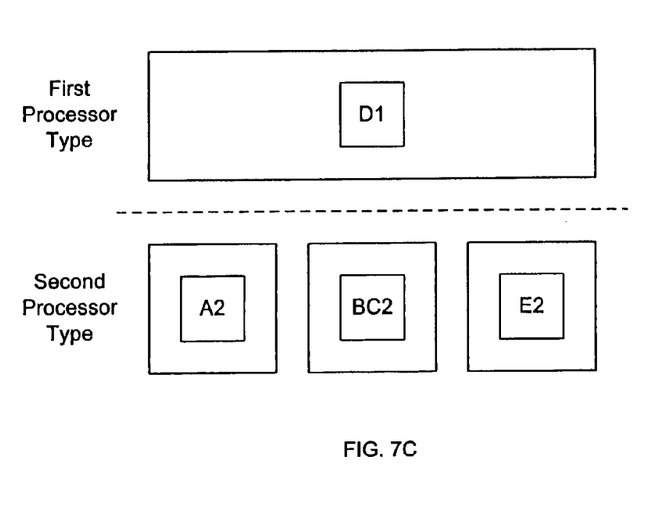
FIG. 7C illustrates one embodiment of executable file assignments.

FIG. 7C illustrates an example of the service assignor 404 assigning the executable files for SP1 (A, B, C, E) and SP2 (A, D, E) to a first processor type and/or a second processor type in accordance with one embodiment. Assume the service assignor decides to assign SP1 to the second processor type. An example of the second processor type may be one or more of the processing engines 322-1-n of network processor 320, sometimes referred to as "fast path" processors. Since SP1 is to be assigned to the fast path, the service assignor 404 may load the set of executables A2, BC2, E2 corresponding to SP1 (A, B, C, E) on the fast path processors. Further assume the service assignor decides to assign SP2 to the first processor type. An example of the first processor type may be the core processor 332 of network processor 320, sometimes referred to as a "slow path" processor. Since the service assignor 404 has previously assigned executable files A2, E2 to fast path processors during assignment operations for SP1, the service assignor 404 assigns only the executable file D1 to the slow path processor to complete the initial assignments for SP2. It may be appreciated that the service assignor 404 may perform assignment operations for the given service paths in any desired order. The embodiments are not limited in this context.

Once the service assignor 404 has performed the initial assignments at block 506, the service assignor 404 may reassign certain services from the processors to which they are currently assigned to other processors based on the service information generated by service monitor 406. Examples of service information may include real time statistical parameters (e.g., service usage parameter) reflecting the data flow (e.g., number of packets) processed by a given service and/or processor. A two-tiered scheduling framework may be implemented for the reassignment operations.

In the first tier, the resources of network processor 320 may be assigned at block 506. The service assignor 404 may assign services across the heterogeneous processors of network processor 320. The service assignor 404 may assign certain services to core processor 332, and other services to processing engines 322-1-n. For example, services having lower demand or lower priority may be assigned to the slower core processor 332, while services having higher demand or higher priority may be assigned to the faster processing engines 322-1-n.

In the second tier, the service assignor 404 may assign services across the homogeneous processors of network processor 320. For example, the service assignor 404 may assign certain services to processing engine 322-1, and other services to processing engine 322-2. This may occur, for example, if the data sets processed by processing engine 322-1 begin to overflow the input or output queues. In some embodiments, for example, the second tier may be performed on a more frequent basis than the first tier. The embodiments, however, are not limited in this context.

The service assignor 404 may perform reassignment operations between heterogeneous processors in accordance with a number of policies or rule sets. Examples of a policy would be to reassign any service representing greater than 70% of the overall data flow to processing engines 322-1-$n$. Any number of policies may be constructed as desired for a given implementation. Once the service type and processor type have been selected, the service assignor 404 may use this information to perform reassignment operations. For example, the service assignor 404 may send a signal to the core processor 332 to load the appropriate executable files to the memory of the appropriate processor. The embodiments are not limited in this context.

The service assignor 404 may also perform reassignment operations between homogeneous processors in accordance with a number of policies or rule sets. For example, the service assignor 404 may perform reassignment operations between homogeneous processors using a symmetric multi-processing (SMP) scheduling technique. SMP may provide faster performance by making multiple symmetric processors available to complete individual processes simultaneously. Unlike asymmetrical multiprocessing, any idle processor may be assigned any task, and additional processors may be added to improve performance and handle increasing loads. The embodiments are not limited in this context.

Figure 7D:
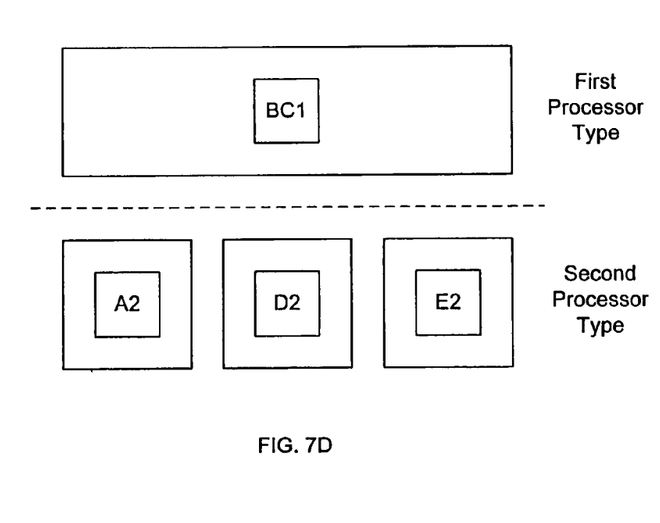
FIG. 7D illustrates one embodiment of executable file reassignments.

FIG. 7D illustrates an example of the service assignor 404 reassigning the executable files for SP1 (A, B, C, E) and SP2 (A, D, E) between heterogeneous processors in accordance with one embodiment. Once the executable files have been assigned to a processor, the processor may begin executing the executable files to perform the associated tasks, such as performing different types of packet processing operations. The service monitor 406 may monitor the load on each processor on a per packet or per service basis. The service monitor 406 maintains and updates a service usage parameter for each service. The service usage parameter may be used to determine when to perform first tier operations, that is, the service assignor 404 may reassign services across the heterogeneous processors of network processor 320 based on the programmed policies and service usage parameters. For example, assume a policy was in place to switch any services to a slow path processor if the service usage parameter for a service is lower than 70% of total packets processed. The service monitor 406 may monitor and update the service usage parameter for executable file BC2 of SP1, and periodically send the service usage parameter to the service assignor 404. The service assignor 404 may evaluate the service usage parameter for executable file BC2 using the appropriate policies, and determine that executable file BC2 needs to be switched to the slow path processor. The service assignor 404 may then switch a portion of SP1 to the slow path processor by unloading BC2 from the fast path processor, and loading BC1 corresponding to SP1 to the slow path processor. This may be accomplished by sending instructions to the core processor 332. The core processor 332 may stop execution of the executable file BC2 by the fast path processor, and load executable file BC1 into the memory associated with the slow path processor. The slow path processor may begin executing the executable file BC1 to perform the service associated with SP1.

Some embodiments may provide several advantages over conventional techniques. For example, service based adaptation may prevent code that is not currently used from being loaded on fast-path processing resources, thereby potentially avoiding unnecessary resource usage. In another example, service based adaptation may reduce I-cache thrashing. In conventional systems, if even one packet for a particular service arrives, the service code may be loaded onto the processor, only to be removed again in a short period of time when other packets are received demanding different services. This may cause thrashing in the I-cache. In some embodiments, the services receiving lower demand are separated from those receiving higher demand, thereby reducing contention for fast-path processing resources. This may facilitate the handling of occasional packets for lower demand service to be handled by the slow-path processing resources. In yet another example, service based adaptation may reduce scheduling complexity for a multicore processor by focusing on the executable files needed for a given service rather than the entire application code set. In still another example, service based adaptation may reduce monitoring overhead since monitoring may be limited to the service distribution needs for all services. The more complicated monitoring requirements (e.g., monitoring of queue depths, processor loads, and so forth), however, may be limited to the subset of processes placed on the fast path processing resources. In yet another example, service based adaptation may result in reduced power consumption by a network device. By reducing the number of executable files assigned to the fast cores, fewer cores may be needed, thereby allowing the other cores to be shut-down when inactive. In still another example, the faster cores typically have a limited amount of memory resources for storing code (e.g., 4 kilobytes on the IXP2400). Due to the limited program memory resources, it may not be possible to load the large number of services that a network forwarding device may need to support. Service based adaptation may allow the relevant services to be loaded, and when the workload changes the network processor may adapt the load to the new set of services. It may be appreciated that other advantages exist in addition to the above-described advantages, and the embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
    a processing device having multiple types of processors to process packets, said processing device comprising a network processor; and
    a service manager to dynamically assign executable files for multiple services to said multiple types of processors during execution of said executable files based on packets processed for each service, the service manager comprising:
        a compiler to identify multiple service types for an application, and generate executable files for said multiple service types; and
        a service assignor to assign said executable files to said multiple types of processors, and reassign an executable file to a different type of processor based on a service usage parameter for a service type corresponding to said executable file.

2. The apparatus of claim 1, wherein said processor types are asymmetrical.

3. The apparatus of claim 1, said compiler to generate executable files for said multiple service types and each type of processor.

4. The apparatus of claim 1, said complier to optimize said executable files.

5. The apparatus of claim 1, said service assignor to reassign an executable file between processors of one type on a periodic basis based on a service usage parameter for a service type corresponding to said executable file.

6. The apparatus of claim 1, said service manager further comprising a service monitor to monitor said number of packets processed for each service type, and generate said service usage parameter for each service type.

7. A system, comprising:
    a network forwarding device having a switch fabric and line cards;
    a processing device to couple to said network forwarding device, said processing device having multiple types of processors to process packets, said processing device comprising a network processor; and
    a service manager to dynamically assign executable files for multiple services to said multiple types of processors during execution of said executable files based on packets processed for each service, the service manager comprising:
        a compiler to identify multiple service types for an application, and generate executable files for said multiple service types; and
        a service assignor to assign said executable files to said multiple types of processors, and reassign an executable file to a different type of processor based on a service usage parameter for a service type corresponding to said executable file.

8. The system of claim 7, wherein said processor types are asymmetrical.

9. The system of claim 7, said compiler to generate executable files for said multiple service types and each type of processor.

10. The system of claim 7, said service assignor to reassign an executable file between processors of one type on a periodic basis based on a service usage parameter for a service type corresponding to said executable file.

11. The system of claim 7, said service manager further comprising a service monitor to monitor said number of packets processed for each service type, and generate said service usage parameter for each service type.

12. A method comprising:
   identifying multiple service types for an application;
   generating executable files for said multiple service types;
   dynamically assigning executable files for multiple services to multiple types of processors during execution of said executable files based on packets processed for each service, said processors comprising part of a network processor; and
   reassigning an executable file to a different type of processor based on a service usage parameter for a service type corresponding to said executable file.

13. The method of claim 12, further comprising reassigning an executable file between processors of one type on a periodic basis based on a service usage parameter for a service type corresponding to said executable file.

14. The method of claim 12, further comprising generating correlation information to indicate a correlation between a service type and set of executable files.

15. The method of claim 12, wherein said reassigning comprises:
   executing said executable files on said processors to process packets;
      monitoring said number of packets processed for each service type; and
      generating a service usage parameter for each service type.

16. An article comprising a computer-readable storage medium containing instructions that if executed enable a system to dynamically assign executable files for multiple services to multiple types of processors during execution of said executable files based on packets processed for each service, said processors comprising part of a network processor;
   the article further comprising instructions that if executed enable the system to identify multiple service types for an application, generate executable files for said multiple service types, assign said executable files to said multiple types of processors, and reassign an executable file to a different type of processor based on a service usage parameter for a service type corresponding to said executable file.

17. The article of claim 16, further comprising instructions that if executed enable the system to reassign an executable file between processors of one type on a periodic basis based on a service usage parameter for a service type corresponding to said executable file.

18. The article of claim 16, further comprising instructions that if executed enable the system to execute said executable files on said processors to process packets, monitor said number of packets processed for each service type, and generate a service usage parameter for each service type.

* * * * *